US010273421B2

(12) United States Patent
Goss et al.

(10) Patent No.: US 10,273,421 B2
(45) Date of Patent: Apr. 30, 2019

(54) MODIFIED FUELS AND METHODS OF MAKING AND USING THEREOF

(71) Applicant: SPIRIT OF THE 21ST CENTURY GROUP, LLC, Bolingbroke, GA (US)

(72) Inventors: David Henry Goss, Warner Robins, GA (US); Thomas Oscar Goss, Jr., Gray, GA (US)

(73) Assignee: Spirit of the 21st Century Group, LLC, Bolingbroke, GA (US)

( * ) Notice: Subject to any disclaimer, the term of this patent is extended or adjusted under 35 U.S.C. 154(b) by 331 days.

(21) Appl. No.: 14/311,731

(22) Filed: Jun. 23, 2014

(65) Prior Publication Data

US 2014/0298713 A1 Oct. 9, 2014

Related U.S. Application Data

(63) Continuation of application No. 12/534,975, filed on Aug. 4, 2009, now Pat. No. 8,790,423.

(Continued)

(51) Int. Cl.
*C10L 1/00* (2006.01)
*C10L 1/02* (2006.01)
(Continued)

(52) U.S. Cl.
CPC ............... *C10L 1/1905* (2013.01); *C10L 1/00* (2013.01); *C10L 1/023* (2013.01); *C10L 1/026* (2013.01); *C10L 1/1824* (2013.01); *C10L 10/00* (2013.01); *C10L 10/02* (2013.01); *C10L 10/10* (2013.01); *C10L 1/1608* (2013.01);
(Continued)

(58) Field of Classification Search
CPC .......... C10L 10/00; C10L 10/02; C10L 10/10; C10L 1/00; C10L 1/023; C10L 1/026; C10L 1/1608; C10L 1/1616; C10L 1/1802; C10L 1/1824; C10L 1/1826; C10L 1/1905; C10L 1/191; C10L 1/1985; C10L 2200/0423;
(Continued)

(56) References Cited

U.S. PATENT DOCUMENTS 1,296,902 A 3/1919 Backhaus
1,891,181 A 12/1932 Richman
(Continued)

FOREIGN PATENT DOCUMENTS

DE 2441737 3/1976
DE 4333418 10/1994
(Continued)

OTHER PUBLICATIONS

Benter, M.M.; "Biomass-oil slurry fuels: an investigation into their preparation and formulation;" Biomass and Bioenergy; 1997; 12:253-261.

(Continued)

*Primary Examiner* — Latosha Hines
(74) *Attorney, Agent, or Firm* — Gardner Groff Greenwald & Villanueva, PC

(57) ABSTRACT

Described herein are modified fuels with improved properties. The modified fuels are more efficient when compared to conventional fuels such as gasoline. Additionally, the modified fuels burn more efficiently and produce fewer emissions. Finally, the modified fuels also do not require any modifications to existing engines.

11 Claims, 3 Drawing Sheets

Related U.S. Application Data

(60) Provisional application No. 61/086,224, filed on Aug. 5, 2008.

(51) Int. Cl.

| | | |
|---|---|---|
| C10L 1/18 | (2006.01) | |
| C10L 1/16 | (2006.01) | |
| C10L 1/19 | (2006.01) | |
| C10L 1/182 | (2006.01) | |
| C10L 10/00 | (2006.01) | |
| C10L 10/02 | (2006.01) | |
| C10L 10/10 | (2006.01) | |
| C10L 1/198 | (2006.01) | |

(52) U.S. Cl.
CPC ........... C10L 1/1616 (2013.01); C10L 1/1802 (2013.01); C10L 1/1826 (2013.01); C10L 1/191 (2013.01); C10L 1/1985 (2013.01); C10L 2200/0423 (2013.01); C10L 2200/0469 (2013.01); C10L 2200/0484 (2013.01); C10L 2270/023 (2013.01)

(58) Field of Classification Search
CPC ..... C10L 2200/0469; C10L 2200/0484; C10L 2270/023
USPC .......................................................... 44/308
See application file for complete search history.

(56) References Cited

U.S. PATENT DOCUMENTS

| | | | |
|---|---|---|---|
| 2,010,005 | A | 8/1935 | Berliner |
| 4,333,739 | A | 6/1982 | Neves |
| 4,405,337 | A | 9/1983 | Mori |
| 4,557,734 | A | 12/1985 | Schwab |
| 4,818,250 | A | 4/1989 | Whitworth |
| 4,915,707 | A | 4/1990 | Whitworth |
| 4,929,252 | A | 5/1990 | Brillheart |
| 5,252,107 | A | 10/1993 | Wilkins |
| 5,501,713 | A | 3/1996 | Wilkins |
| 5,575,822 | A * | 11/1996 | Wilkins, Jr. ............... C10L 1/02 44/307 |
| 5,607,486 | A | 3/1997 | Wilkins |
| 5,713,965 | A | 2/1998 | Foglia |
| 6,015,440 | A | 1/2000 | Noureddini |
| 6,174,501 | B1 | 1/2001 | Noureddini |
| 6,348,074 | B2 | 2/2002 | Wenzel |
| 6,511,520 | B1 | 1/2003 | Eber |
| 6,623,535 | B1 | 9/2003 | Kief |
| 6,642,399 | B2 | 11/2003 | Boocock |
| 6,743,266 | B2 | 6/2004 | Derosa |
| 6,835,217 | B1 | 12/2004 | Derosa |
| 6,843,812 | B2 | 1/2005 | Stephanos |
| 6,946,008 | B2 | 9/2005 | Wenzel |
| 7,078,005 | B2 | 7/2006 | Smith |
| 7,112,229 | B2 | 9/2006 | Khalil |
| 8,057,557 | B2 | 11/2011 | Theaker |
| 2002/0124461 | A1 | 9/2002 | Stephanos |
| 2003/0009930 | A1 | 1/2003 | Derosa |
| 2003/0083514 | A1 | 5/2003 | Boocock |
| 2003/0167681 | A1 | 9/2003 | Puche |
| 2004/0096382 | A1 | 5/2004 | Smith |
| 2005/0011112 | A1 | 1/2005 | Khalil |
| 2005/0039381 | A1 | 2/2005 | Langer |
| 2005/0097812 | A1 | 5/2005 | Guffogg |
| 2005/0120618 | A1 | 6/2005 | Stephanos |
| 2005/0120621 | A1 | 6/2005 | Lawson |
| 2005/0204612 | A1 | 9/2005 | Connemann |
| 2005/0232956 | A1 | 10/2005 | Bist |
| 2005/0262760 | A1 | 12/2005 | Lawson |
| 2006/0080891 | A1 | 4/2006 | Ghosh |
| 2006/0224005 | A1 | 10/2006 | Felly |
| 2006/0229222 | A1 * | 10/2006 | Muller ................... C10L 1/143 510/267 |
| 2007/0039239 | A1 | 2/2007 | Forester |
| 2007/0151146 | A1 | 7/2007 | Lee |
| 2007/0169407 | A1 | 7/2007 | Roeder |
| 2007/0214712 | A1 | 9/2007 | Garwood |
| 2007/0251141 | A1 | 11/2007 | Bist |
| 2007/0277429 | A1 | 12/2007 | Jackam |
| 2007/0277430 | A1 | 12/2007 | Jackam |
| 2007/0277432 | A1 | 12/2007 | Jackam |
| 2007/0283619 | A1 | 12/2007 | Hillion |
| 2008/0066377 | A1 | 3/2008 | Cunningham |
| 2008/0104884 | A1 | 5/2008 | Boux |
| 2010/0005706 | A1 | 1/2010 | Burgazli |

FOREIGN PATENT DOCUMENTS

| | | |
|---|---|---|
| JP | S58-222189 | 12/1983 |
| WO | 1981000721 | 3/1981 |
| WO | 2000063322 | 10/2000 |
| WO | 2002092731 | 11/2002 |
| WO | 2006088462 | 8/2006 |

OTHER PUBLICATIONS

Bond, R.E.; "Lubricity Problems and Solutions for a Methanol Fueled Gas Turbine;" Rheology and Fluid Mechanics of Nonlinear Materials; 2000; FED vol. 252:55-58.

De Castro Dantas, T.N.; "New microemulsion systems using diesel and vegetable oils;" Fuel; 2001; 80:75-81.

Demirbas, A.; "Chemical and fuel properties of seventeen vegetable oils;" Energy Sources; 2003; 25:721-728.

Dos Santos, I.C.F.; "Studies of *Terminalia catappa* L. oil: characterization and biodiesel production;" Bioresrouce Technology; 2008; 99:6545-6549.

Estefan, R.M.; "Evaluation of possible methanol fuel additives for reducing engine wear and/or corrosion;" in Methanol Fuel Formulations and In-Use Experiences, published by the Society of Automotive Engineers; 1990; pp. 17-39.

Fabbri, D.; "Properties of a potential biofuel obtained from soybean oil by transmethylation with dimethyl carbonate;" Fuel; 2007; 86:690-697.

Gondal, A.K.; "Some studies on the injector needle wear using diesel and methanol fuels by radiotracers;" 7th International Symposium on Alcohol Fuels; Paris; Oct. 20-23, 1986.

Komers, K.; "Biodiesel from rapeseed oil, methanol and KOH: 3. Analysis of composition of actual reaction mixture;" Eur. J. Lipid Sci. Technol.; 2001; 103:363-371.

Mittelbach, M.; "Transesterification of heated rapeseed oil for extending diesel fuel;" J. Am. Oil Chemists Soc.; 1999; 76:545-550.

Murayama, T.; "A study on diesel engines with alcohol fuels;" Bulletin of the JSME; 1983; 26:216-218.

Schwab, A.W.; "Preparation and properties of diesel fuels from vegetable oils;" Fuel; 1987; 66:1372-1378.

Schwab, A.W.; "Triglyceride/aqueous ethanol/1-butanol microemulsions;" Journal of Dispersion Science and Technology; 1983; 4:1-17.

Thomas, A.; "Fats and Fatty Oils;" Ullmann's Encyclopedia of Industrial Chemistry; Jun. 15, 2000; p. 1-73.

European Office Action for 09791033.5 dated Oct. 8, 2011.
European Office Action for 09791033.5 dated Mar. 15, 2012.
European Office Action for 09791033.5 dated Jul. 12, 2012.
International Search Report for PCT/US09/052367, dated Apr. 16, 2010.
U.S. Office Action for U.S. Appl. No. 12/534,975 dated Jan. 31, 2013.
U.S. Office Action for U.S. Appl. No. 12/534,975 dated Jul. 5, 2013.
U.S. Office Action for U.S. Appl. No. 12/534,975 dated Mar. 14, 2014.

* cited by examiner

MODIFIED FUELS AND METHODS OF MAKING AND USING THEREOF

CROSS REFERENCE TO RELATED APPLICATIONS

This application is a continuation application of U.S. application Ser. No. 12/534,975, filed on Aug. 4, 2009, which claims priority to U.S. provisional application Ser. No. 61/086,224, filed Aug. 5, 2008, which are hereby incorporated herein by reference in their entirety for all purposes.

BACKGROUND

Due to rising oil prices and environmental concerns with increased emissions, a number of alternative fuels and fuel additives have been developed. A number of different approaches have been investigated to increase the efficiency of fuels and reduce emissions. Examples of alternatives to fossil fuels include the use of natural gas, propane, and electricity. Although these are viable substitutes for petroleum based fuels, they require a large investment in automobile modification and infrastructure to implement these technologies.

Another approach involves the use of alcohols in combination with fossil fuels. Alcohols have good combustion properties and are readily available. For example, ethanol can be obtained from a wide variety of sources such as, for example, starchy grains, potatoes, industrial by-products, and products of waste materials. Although the use of ethanol in combination with fossil fuels is a viable option, there are some drawbacks with its use. When ethanol is blended with hydrocarbons, the resulting mixture has an unacceptably high rate of evaporation, which may restrict its use in certain regions having strict emissions restrictions. Gasoline blended with ethanol is very sensitive to water, which can result in limited phase stability limited phase stability can result in significant engine problems such as, for example, such as stalling, fuel-line freezing, and the like.

The use of other alcohols has been investigated in view of the limitations associated with ethanol. For example, the use of methanol is one way to increase the octane number and reduce emissions. However, the use of higher amounts of methanol requires modification of the engine to avoid damage during combustion. For example, in order to operate an internal combustion engine having spark ignition with a combustion fuel containing more than 5% by volume of methanol, the engine has to be equipped with methanol-resistant sealing materials. Moreover, similar to ethanol, methanol has a high affinity for water, which can lead to phase separation when combined with gasoline.

Therefore, it would be desirable to have a fuel that burns cleaner (i.e., reduced emissions) and is more efficient (e.g., increased miles per gallon and horse power). It would also desirable that the use of the fuel does not require any modifications to the existing engine or require advanced technology to use the fuel. The modified fuels described herein address these needs.

SUMMARY

Described herein are modified fuels with improved properties. The modified fuels are more efficient when compared to conventional fuels such as gasoline. Additionally, the modified fuels burn more efficiently and produce fewer emissions. Finally, the modified fuels also do not require any modifications to existing engines. The advantages of the modified fuels described below will be realized and attained by means of the elements and combinations particularly pointed out in the appended claims. It is to be understood that both the foregoing general description and the following detailed description are exemplary and explanatory only and are not restrictive.

BRIEF DESCRIPTION OF THE DRAWINGS

The accompanying drawings, which are incorporated in and constitute a part of this specification, illustrate several aspects described below.

DETAILED DESCRIPTION

Figure 1:
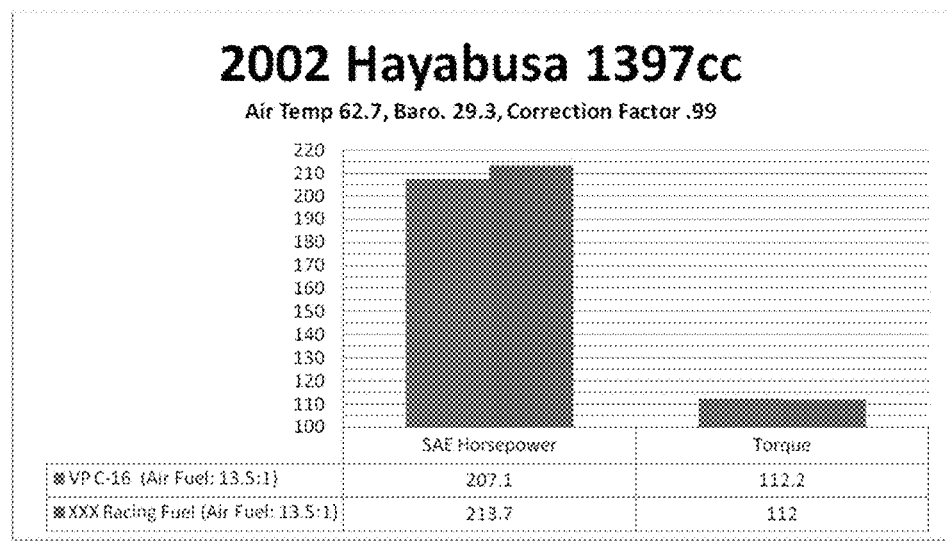
FIGS. 1-3 show the results of dynometer runs of several commercially-available race fuels versus modified fuels described herein.

Before the present compounds, compositions, and/or methods are disclosed and described, it is to be understood that the aspects described below are not limited to specific compounds, synthetic methods, or uses as such may, of course, vary. It is also to be understood that the terminology used herein is for the purpose of describing particular aspects only and is not intended to be limiting.

In this specification and in the claims that follow, reference will be made to a number of terms that shall be defined to have the following meanings:

It must be noted that, as used in the specification and the appended claims, the singular forms "a," "an" and "the" include plural referents unless the context clearly dictates otherwise. Thus, for example, reference to "a lower alcohol" includes mixtures of two or more such alcohols, and the like.

"Optional" or "optionally" means that the subsequently described event or circumstance can or cannot occur, and that the description includes instances where the event or circumstance occurs and instances where it does not. For example, the phrase "optional additive" means that the additive may or may not be present in the modified fuel.

References in the specification and concluding claims to parts by weight, of a particular element or component in a composition or article, denotes the weight relationship between the element or component and any other elements or components in the composition or article for which a part by weight is expressed. Thus, in a compound containing 2 parts by weight of component X and 5 parts by weight component Y, X and Y are present at a weight ratio of 2:5, and are present in such ratio regardless of whether additional components are contained in the compound.

A weight percent of a component, unless specifically stated to the contrary, is based on the total weight of the formulation or composition in which the component is included.

Described herein are modified fuels with improved properties. As will be described below, the modified fuels have several improved properties and characteristics compared to the base fuel. In one aspect, the modified fuel includes:

(a) a base fuel in the amount of greater than 40% by volume of a gallon of modified fuel;

(b) a lower alcohol in the amount of greater than 10% by volume of a gallon of modified fuel; and (c) a triglyceride derived from a fatty acid comprising at least one hydroxyl group, wherein the modified fuel comprises a substantially homogeneous solution, and the modified fuel does not contain (i) a surfactant selected from the group consisting of a castor oil ethoxylate and a polyethoxyethanol, (ii) additional naphtha not naturally occurring in the base fuel, or a combination thereof.

In another aspect, the modified fuel includes:
(a) a base fuel;
(b) a lower alcohol in the amount of greater than 10% by volume of a gallon of modified fuel;
(c) a triglyceride derived from a fatty acid comprising at least one hydroxyl group; and
(d) a terpene in the amount of less than 0.1% by weight of the modified fuel.
wherein the modified fuel comprises a substantially homogeneous solution. In a further aspect, the modified fuel includes:
(a) a base fuel;
(b) methanol in the amount of greater than 10% by volume of a gallon of modified fuel;
(c) ethanol in the amount of greater than 5% by volume of a gallon of modified fuel; and
(d) a triglyceride derived from a fatty acid comprising at least one hydroxyl group,
wherein the modified fuel comprises a substantially homogeneous solution.

Each component is described in detail below.

Examples of base fuels useful herein include, but are not limited to, any hydrocarbon fuel such as, for example, gasoline, diesel, kerosene, jet fuels, and the like. When the fuel is gasoline, it can be derived from straight-chain naphtha, polymer gasoline, natural gasoline, catalytically cracked or thermally cracked hydrocarbons, catalytically reformed stocks, and the like. The gasoline can also be any grade of unleaded fuel ranging from 85 to 100. The amount of base fuel used to produce the modified fuels can vary depending upon the application of the modified fuel. In one aspect, the amount of base fuel is greater than 40% by volume of a gallon of modified fuel. In another aspect, the modified fuel contains from 40% to 80% by volume of a gallon of modified fuel. In other aspects, the base fuel is 40%, 45%, 50%, 55%, 60%, 65%, 70%, 75%, or 80% by volume per gallon of modified fuel, where any value can provide an endpoint for a range (e.g., 45% to 75%, 50% to 80%). In other aspects, the base fuel is about is 40%, 45%, 50%, 55%, 60%, 65%, 70%, 75%, or 80% by weight of the modified fuel, where any value can provide an endpoint for a range (e.g., 45% to 75%, 50% to 80%). The base fuel does not require any special processing when converted to the modified fuel. The base fuel can naturally contain components such as naphtha; however, the preparation of the modified fuels does not require the use of additional naphtha not already present in the base fuel.

The modified fuels described herein contain one or more lower alcohols. The term "lower alcohol" as used herein is defined as ROH, where R is a $C_1$ to $C_6$ alkyl group. For example, the lower alcohol can include methanol, ethanol, propanol, butanol, pentanol, hexanol, or any combination thereof. The lower alcohol can also include different isomers of the same alcohol. For example, propanol can include n-propanol or isopropanol. In certain aspects, two or more lower alcohols are present in the modified fuel. For example, methanol and ethanol can be used to produce the modified fuel. The amount of lower alcohol used to produce the modified fuels can vary depending upon the application of the modified fuel. In one aspect, the lower alcohol is greater than 10% by volume of a gallon of modified fuel. In another aspect, the lower alcohol is from 10% to 40% by volume of a gallon of modified fuel. In other aspects, the lower alcohol is 10%, 15%, 20%, 25%, 30%, 35%, or 40% by volume per gallon of modified fuel, where any value can provide an endpoint for a range (e.g., 15% to 35%, 20% to 40%). In another aspect, the lower alcohol is methanol in the amount of 10% to 40% by volume of a gallon of modified fuel. Alternatively, the lower alcohol is methanol in the amount of 10%, 15%, 20%, 25%, 30%, 35%, or 40% by weight of a gallon of modified fuel, where any value can provide an endpoint for a range (e.g., 15% to 35%, 20% to 40%). The lower alcohol can be any grade and does not require additional purification or special processing.

In certain aspects, the modified fuel contains a mixture of methanol and ethanol. Depending upon the source of the base fuel, the base fuel may contain small amounts of ethanol and other lower alcohols. However, in this aspect, ethanol is an additional component added to the base fuel to produce the modified fuel. The purity of the ethanol used herein is not relevant for producing the modified fuels. In one aspect, the ethanol is E100, which is 98% ethanol and 2% gasoline. The amount of ethanol used to produce the modified fuels can vary depending upon the application of the modified fuel. In one aspect, the amount of ethanol is greater than 5% by volume of a gallon of modified fuel. In another aspect, ethanol is from 5% to 40% by volume of a gallon of modified fuel. In other aspects, ethanol is 5%, 10%, 15%, 20%, 25%, 30%, 35%, or 40% by volume per gallon of modified fuel, where any value can provide an endpoint for a range (e.g., 15% to 35%, 20% to 40%). In another aspect, ethanol is 5%, 10%, 15%, 20%, 25%, 30%, 35%, or 40% by weight of a gallon of modified fuel, where any value can provide an endpoint for a range (e.g., 15% to 35%, 20% to 40%). The addition of ethanol can increase the burn rate of the fuel, which in turn increases horsepower and (efficiency) and reduces emissions.

The modified fuels contain a triglyceride, wherein the triglyceride is the reaction product between glycerol and a fatty acid, and the fatty acid has at least at least one hydroxyl group. The fatty acid with at least one hydroxyl group is also referred to herein as a "hydroxy fatty acid." The significance of the triglyceride with respect to formulating the modified fuels is described below. The hydroxy fatty acid has the general formula R'C(O)OH, wherein R' is a saturated or unsaturated hydrocarbon chain having from 10 to 25 carbon atoms, and at least one hydroxyl group is covalently attached to a carbon atom of the hydrocarbon chain. The hydrocarbon can be linear or branched. In the case when the hydrocarbon is unsaturated, the hydrocarbon can have one carbon-carbon double bond or multiple carbon-carbon double bonds. Examples of monohydroxy fatty acids (i.e., one hydroxyl group present on the fatty acid) include, but are not limited to, hydroxynervonic acid, cerebronic acid, 10-hydroxy-20 decenoic acid, hydrox-2-decenoic acid 10-phosphate, strophantus acid, lesquerolic acid, densipolic acid, auricolic acid, β-dimorphecolic acid, kamlolenic acid, 8-hydroxyoctadeca-9.11-diynoic acid, 8-hydroxyoctadeca-17-en-9.11-diynoic acid (Isanolic), or 8-hydroxyoctadeca-13.17-dien-9.11-diynoic acid. Examples of polyhydroxy fatty acids (i.e., two or more hydroxyl groups) include, but are not limited to, axillarenic acid, tetrapedic acids, byrsonic acid, 9,10-dihydroxyoctadecanoic acid, phaseolic acid, phloionolic acid, Resolvin D1, 10,17S-docosatriene, or Resolvin E1.

The triglyceride can be produced from one hydroxy fatty acid, two hydroxy fatty acids, or three hydroxy fatty acids. In one aspect, the triglyceride is produced from three hydroxy fatty acids, where the triglyceride has three hydroxy fatty acid residues. In one aspect, the hydroxy fatty acid is the same fatty acid. In other aspects, two or three different hydroxy fatty acids can be used to produce the triglyceride. It is also contemplated that mono- and diglycerides can also be present in small amounts.

In other aspects, the triglyceride can be produced from a combination of non-hydroxy fatty acids and hydroxy fatty acids. Thus, in this aspect, the triglyceride has at least one hydroxy fatty acid residue and at least one non-hydroxy fatty acid. Examples of non-hydroxy fatty acids include, but are not limited to, butanoic acid, hexanoic acid, octanoic acid, decanoic acid, dodecanoic acid, tetradecanoic acid, hexadecanoic acid, octadecanoic acid, eicosanoic acid, docosanoic acid, tetracosanoic acid, myristoleic acid, palmitoleic acid, oleic acid, linoleic acid, α-linolenic acid, arachidonic acid, eicosapentaenoic acid, erucic acid, or docosahexaenoic acid. In other aspects, a triglyceride derived from at least one hydroxy fatty acid can be used in combination with one or more triglycerides that are not derived from a hydroxy fatty acid.

In one aspect, the triglyceride having at least one hydroxyl group is castor oil. Castor oil is a triglyceride composed predominantly of ricinoleic acid residues. Castor oil also contains small amounts of oleic acid residues and linoleic acid residues. Different grades of castor oil can be used herein. In one aspect, the castor oil is pale pressed or AA standard castor oil, where the castor oil is obtained from the first pressing of the castor bean. Pale pressed castor oil is generally lighter in color and lower in acidity. Another grade of castor oil useful herein is #1 imported, also known as industrial castor oil, which is obtained from a mixture of the first pressing and the second phase of production followed by solvent extraction. Examples of castor useful herein include Baker's Grade AA castor oil and castor oil manufactured by Klotz (e.g., Klotz Benol).

The amount of triglyceride used to produce the modified fuels can vary depending upon the application of the modified fuel. In general, small amounts of triglyceride are needed to produce the stable fuels described herein. If an excess of triglyceride is used, the emissions can be adversely affected. In one aspect, triglyceride is from 5 mL to 30 mL per gallon of modified fuel. In other aspects, the amount of triglyceride is 5 mL, 10 mL, 15 mL, 20 mL, 25 mL, or 30 mL per gallon of modified fuel, where any value can provide an endpoint for a range (e.g., 15 mL to 30 mL, 5 mL to 20 mL). In another aspect, the amount of triglyceride is less than 1% by volume, less than 0.75% by volume, or less than 0.50% by volume of the modified fuel. In a further aspect, the triglyceride is castor from 6 mL to 26 mL by volume per gallon of modified fuel. In another aspect, the amount of triglyceride is less than 1% by weight, less than 0.75% by weight, or less than 0.50% by weight of the modified fuel.

In certain aspects, the triglyceride can be modified to enhance the hydrophilic and/or hydrophobic properties of the compound. In one aspect, one or more fatty acid residues of the triglyceride can be substituted with a polyalkylene group. For example, the triglyceride can be an ethoxylated castor oil. The term "ethoxylated castor oil" is also referred to in the art as polyoxyl castor oil, polyethylene glycol castor oil, or polyethoxylated castor oil, where one of the fatty acid residues is substituted with a polyethylene glycol unit. By varying the degree of substitution and the length of the polyalkylene group, the hydrophilic properties of the triglyceride can be modified. In one aspect, the ethoxylated triglyceride can be products sold under the tradename Croduret manufactured by Croda Chemicals LTD. and E-Z-MULSE™ manufactured by Florida Chemical Company.

The modified fuels described herein can include additional components depending upon the application of the fuel as well as the desired properties of the fuel. In one aspect, the modified fuel can include one or more natural oils. The term "natural oil" as used herein includes naturally occurring oils that are derived from animal or plant sources. Examples of natural oils include, but are not limited to, coconut oil, babassu oil, palm kernel oil, palm oil, olive oil, rape oil, beef tallow oil, whale oil, sunflower, cottonseed oil, linseed oil, tung oil, tallow oil, lard oil, peanut oil, soya oil, or any combination thereof. In one aspect, the natural oil is olive such as, for example, virgin olive oil, refined olive oil, and pomace olive oil. The olive oil generally does not contain any particulate matter such as pulp and the like. Thus, the olive oil can be naturally derived or, in the alternative, derived from chemical techniques to provide the olive oil useful herein. Not wishing to be bound by theory, the natural oil increases horsepower as well as reduce emissions by creating more oxygen in the exhaust stream.

The amount of natural oil used to produce the modified fuels can vary depending upon the application of the modified fuel. In one aspect, natural oil is from 0.01 mL to 1 mL per gallon of modified fuel. In other aspects, the amount of natural oil is 0.01 mL, 0.05 mL, 0.10 mL, 0.20 mL, 0.30 mL, 0.40 mL, 0.50 mL, 0.60 mL, 0.70 mL, 0.80 mL, 0.90 mL, or 1.00 mL per gallon of modified fuel, where any value can provide an endpoint for a range (e.g., 0.01 mL to 0.50 mL, 0.10 mL to 0.80 mL). In a further aspect, the natural oil is olive oil from 0.05 mL to 0.60 mL per gallon of modified fuel.

In another aspect, the modified fuel can include one or more terpenes. Terpenes are natural or synthetic compounds derived from one or more isoprene units. Examples of terpenes useful herein include, but are not limited to, hemiterpenes (e.g., prenol and isovaleric acid), monoterpenes (e.g., geraniol, limonene and terpineol), sesquiterpenes (e.g., farnesol), diterpenes (e.g., cafestol, kahweol, cembrene and taxadiene), sesterterpenes, triterpenes (e.g., squalene), tetraterpenes (e.g, lycopene), and polyterpenes. In one aspect, the terpene is an alpha-pinene, a limonene (D- or L-), a menthol, a linalool, a terpinene, a camphene, a careen, or any combination thereof. In another aspect, the terpene is limonene present in the gasoline additive Ecotane® manufactured by T2 Labs. Not wishing to be bound by theory, the terpene increases oxygen content of the modified fuel. Additionally, the terpene helps the modified fuel burn completely within the engine cylinder, which prevents excess residual fuel from being introduced into the atmosphere as well as prevents residue formation in the engine.

The amount of terpene used to produce the modified fuels can vary depending upon the application of the modified fuel. In one aspect, the terpene is from 0.01 mL to 1 mL per gallon of modified fuel. In other aspects, the amount of terpene is 0.01 mL, 0.05 mL, 0.10 mL, 0.20 mL, 0.30 mL, 0.40 mL, 0.50 mL, 0.60 mL, 0.70 mL, 0.80 mL, 0.90 mL, or 1.00 mL per gallon of modified fuel, where any value can provide an endpoint for a range (e.g., 0.01 mL to 0.50 mL, 0.10 mL to 0.80 mL). In another aspect, the amount of terpene is less than 1% by volume, less than 0.75% by volume, less than 0.50% by volume, less than 0.25% by volume, or less than 0.10% by volume of the modified fuel. In a further aspect, the terpene is limonene from 0.01 mL to 0.45 mL per gallon of modified fuel. In another aspect, the terpene is present in the amount of less than 0.1% by weight, less than 0.075% by weight, less than 0.05% by weight, or less than 0.025% by weight of the modified fuel.

In other aspects, the modified fuel includes a lubricating oil. Depending upon the amount of lower alcohol that is used to formulate the modified fuel, the amount and type of lubricating fuel can vary. In general, when higher amounts of lower alcohol are present in the modified fuel, a lubricating oil can be used to lubricate and protect engine parts during combustion. The lubricating oil can be a synthetic or natural material. For example, the natural oils described herein can be used alone or in combination with other materials and perform as a lubricating oil. In one aspect, the lubricating oil is a synthetic oil composed of a polyol. A "polyol" as used herein is a compound with two or more hydroxyl groups. For example, the polyol can be ethylene glycol. Alternatively, the polyol can be a polymer such as, for example, polyethylene glycol. The amount of polyol present in the lubricating oil can range from 50% to 90% by weight of the lubricating oil. Lubricating oils useful herein include, but are not limited to, Klotz Techniplate KL200 manufactured by Klotz Synthetic Lubricants, Redline All-sport Synthetic 2-Stroke oil manufactured by Red Line Synthetic Oil Corp., and Lucas 2-Stroke Synthetic manufactured by Lucas Oil Products Inc. The amount of lubricating oil used to produce the modified fuels can vary depending upon the application of the modified fuel. In one aspect, the lubricating oil is from 5 mL to 40 mL per gallon of modified fuel. In other aspects, the amount of lubricating oil is 5 mL, 10 mL, 15 mL, 20 mL, 25 mL, 30 mL, 35 mL, or 40 mL per gallon of modified fuel, where any value can provide an endpoint for a range (e.g., 10 mL to 30 mL, 15 mL to 35 mL). In another aspect, the lubricating oil is present in the amount of less than 1% by weight, less than 0.75% by weight, less than 0.5% by weight, or less than 0.25% by weight of the modified fuel.

The modified fuels described herein can include additional additives depending upon the application of the fuel. Examples of such additives include, but are not limited to, oxygenated aromatic compounds (synthetic or natural compounds), alkanolamine derivatives (e.g., the reaction product between an alkanolamine and synthetic or natural oil), naphtha (e.g., VM&P), antiknock agents, lead scavengers, ashless dispersants, deposit preventers or modifiers, dyes, antioxidants, rust inhibitors, bacteriostatic agents, gum inhibitors, metal deactivators, demulsifiers, upper cylinder lubricants, corrosive and oxidation inhibitors, metal detergent additives, metal antiwear additives, antifoaming agents, or any combination thereof. These additives are optional components, and are not required to produce the modified fuel formulations described herein. In other aspects, the modified fuels do not require the use of ethers such as, for example, methyl-tert-butyl ether (MTB) or benzene to oxygenate the fuel and increase horsepower.

The modified fuels can be used in a variety of different engines. For example, the modified fuels can be used in all internal combustion engines including spark ignited (gasoline) and compression ignited (diesel) engines. The fuels can be used in mobile engines such as, for example, locomotive engines, marine engines, automotive engines (e.g., domestic and racing), motorcycle engines, truck engines, airplane engines and the like, as well as stationary application such as power plants.

The engines may be two-cycle or four-cycle. The engines do not require any modification prior to use of the modified fuels. For example, 87 to 93 grade gasoline currently used to power automobiles can be substituted with the modified fuels described herein without any modification to automobile engine.

The modified fuels described herein provide numerous advantages over existing fuels. As mentioned above, the use of the modified fuels does not require any modifications to the existing engine. The modified fuels for the most part burn completely within the engine cylinder, which is due in large part to the presence of the higher amounts of lower alcohol (e.g., methanol) present in the modified fuels. The process of making the modified fuels is described in detail below. With respect to burning more efficiently within the engine, the modified fuels have numerous advantages. For example, the modified fuels increase engine life by preventing residues from forming within the engine, which is a leading cause of engine failure. In addition to prolonging engine life, the modified fuels enhance the efficiency of the fuel burning vehicle. The term "enhance" as used herein is any improvement exhibited by the modified fuels versus a control (e.g., conventional gasoline). Because the modified fuels burn more completely within the engine, less fuel is wasted and, thus, the engine is much more efficient (e.g., increased miles per gallon).

Another important advantage with respect to modified fuels is that the engine produces fewer emissions. With increased combustion within the engine, less fuel is converted to toxic materials such as, for example, hydrocarbons, carbon monoxide, carbon dioxide, and nitrogen oxide. As will be shown in the Examples below, the modified fuels substantially reduce or completely prevent the emissions of certain materials based upon standard emission tests such as the ASM2 25/25 test (25 MPH flat) and 50/15 test (50 MPH uphill). Indeed, the one of the main by-products of combustion of the modified fuels is oxygen. Not wishing to be bound by theory, the modified fuels described herein are highly oxygenated, which helps reduce carbon monoxide emissions.

In addition to the advantages described above, the modified fuels described herein provide improved horsepower versus conventional fuels based on dynometer runs. As shown in the Examples, the modified fuels can increase horsepower by up to 2% when compared to commercially-available fuels. This is particularly important in race fuels, where highly toxic and flammable fuels are used. Not wishing to be bound by theory, it is believed the increased horsepower is due to the higher oxygen content in the fuel, which is due to the presence of higher amounts of lower alcohol present in the fuel. For example, the modified fuels have an oxygen weight percentage from 2% to 25%, from 5% to 20%, 5% to 15%, or from 8% to 12%. As a comparison, gasoline has an oxygen weight percentage of close to zero percent.

The modified fuels described herein can be designed for specific applications. For example, the modified fuels can be formulated for use in domestic engines such as, for example, automobiles and motorcycles. In one aspect, the modified fuel includes the following components:

(a) a base fuel in the amount of 40% to 80% by volume of a gallon of modified fuel;
(b) a lower alcohol in the amount of 10% to 40% by volume of a gallon of modified fuel, wherein the lower alcohol is not ethanol;
(c) ethanol in the amount of 5% to 40% by volume of a gallon of modified fuel;
(d) a triglyceride comprising castor oil present in the amount of 5 mL to 30 mL per gallon of modified fuel;
(e) olive oil present in the amount of 0.01 mL to 1 mL per gallon of modified fuel; and
(f) limonene present in the amount of 0.01 mL to 1 mL per gallon of modified fuel.

In another aspect, the modified fuel is composed of:
(a) gasoline in the amount of 65% to 75% by volume of a gallon of modified fuel;
(b) methanol in the amount of 10% to 20% by volume of a gallon of modified fuel;

(c) ethanol in the amount of 10% to 20% by volume of a gallon of modified fuel;
(d) castor oil present in the amount of 10 mL to 20 mL per gallon of modified fuel;
(e) olive oil present in the amount of 0.01 mL to 0.1 mL per gallon of modified fuel;
(f) limonene present in the amount of 0.01 mL to 0.1 mL per gallon of modified fuel; and
(g) a lubricating oil present in the amount of 10 mL to 20 mL per gallon of modified fuel.

In another aspect, the modified fuel has the following components when used in domestic engines: 70% gasoline by volume per gallon of modified fuel, 15% methanol by volume per gallon of modified fuel, 15% ethanol by volume per gallon of modified fuel, 16 ml of lubricating oil (e.g., KL 200 Synthetic lubricant) per gallon of modified fuel, 14 ml of castor oil per gallon of modified fuel, 0.05 ml virgin olive oil per gallon of modified fuel, and 0.05 ml of limonene per gallon of modified fuel.

In other aspects, the modified fuels can be formulated as race fuels for high-performance vehicles. In one aspect, the modified fuel is composed of:
(a) gasoline in the amount of 40% to 60% by volume of a gallon of modified fuel;
(b) methanol in the amount of 20% to 30% by volume of a gallon of modified fuel, wherein the lower alcohol is not ethanol;
(c) ethanol in the amount of 20% to 30% by volume of a gallon of modified fuel;
(d) castor oil present in the amount of 15 mL to 25 mL by volume per gallon of modified fuel;
(e) olive oil present in the amount of 0.05 mL to 0.1 mL per gallon of modified fuel;
(f) limonene present in the amount of 0.01 mL to 0.1 mL per gallon of modified fuel; and
(g) a lubricating oil present in the amount of 25 mL to 35 mL per gallon of modified fuel.

In another aspect, the modified fuel has the following components when used in race engines: 50% gasoline by volume per gallon of modified fuel, 25% methanol by volume per gallon of modified fuel, 25% ethanol by volume per gallon of modified fuel, 28 ml of lubricating oil (e.g., KL 200 Synthetic lubricant) per gallon of modified fuel, 19 ml of castor oil per gallon of modified fuel, 0.07 ml of virgin olive oil per gallon of modified fuel, and 0.05 ml of limonene per gallon of modified fuel. With respect to the racing fuels, higher amounts of lower alcohol are present when compared to the modified fuels used in domestic engines.

The modified fuels described herein contain high amounts of one or more lower alcohol in combination with a base fuel. In general, lower alcohols such methanol and ethanol have the tendency to absorb water. When combined with fuels such as gasoline, methanol and ethanol can phase separate when contaminated with water. This is undesirable, as this leads to unpredictable performance of the fuel (e.g., decreased efficiency, increased emissions, etc.). Additionally, methanol is extremely corrosive to engine parts such as aluminum and magnesium; therefore, it is desirable to incorporate higher amounts of lower alcohol into base fuels without undesirable side-effects of phase separation. Currently, fuels that contain lower alcohols are very unstable and require special handling and storage for the reasons discussed above.

The modified fuels described herein are substantially homogenous solutions that can be stored for extended periods of time. The phrase "substantially homogenous solution" as used herein is a solution that is clear with little to no phase separation or particulate matter in solution. The modified fuels described herein are stable (i.e., substantially homogeneous) at room temperature and require no special handling or storage. This is yet another advantage of the fuels described herein where conventional fuels are unstable over time, which leads to inconsistent performance and fluctuations in emissions. The absence of phase separation also prevents the formation of deposits within the engine as well as prevent the destruction of engine parts. The modified fuels have a specific gravity greater than 0.71, or from 0.715 to 0.795 at 60° F. The specific gravity of the modified fuels can be maintained for extended periods of time, which is also indicative that the modified fuels are stable and not susceptible to contamination by water. In general, the modified fuels contain little if any water (e.g., less than 0.5% wt, less than 0.4% wt, less than 0.3% wt, less than 0.2% wt, or less than 0.1% wt). For example, the modified fuels described herein are stable at room temperature to at least 90 days without undergoing phase separation. Additionally, the modified fuels are stable at low temperatures (e.g., subzero temperatures) and show no signs of phase separation. Not wishing to be bound by theory, it is believed that the presence of the triglyceride derived from a fatty acid with at least one hydroxyl group helps make the hydrophilic lower alcohol more compatible with the hydrophobic base fuel. In the absence of the triglyceride, the lower alcohol is not compatible with the base fuel, and phase separation is observed. Thus, additional components such as surfactants (e.g., polyethoxyethanol non-ionic surfactants such as Triton X-100, Triton X-114 (octylphenoxy polyethoxy-ethanol), and Triton X-110, and glycol ethers such as ethylene glycol monobutyl ether) are not required to produce stable fuels.

The process for making the modified fuels generally involves mixing the base fuel, lower alcohol, and triglyceride for a sufficient time and temperature until a substantially homogeneous solution is produced. The time and temperature of the mixing step can vary depending upon the relative amounts of base fuel and lower alcohol used. Due to the stability of the modified fuels, no special equipment is needed to produce and store the modified fuels. Additionally, the process can be conducted at room temperature and atmospheric pressure. Thus, any mixing equipment can be used herein. The modified fuels can be made by a batch, semi-batch or a continuous process. During the process, it is possible to monitor and adjust the flow rates of the base fuel, lower alcohol, triglyceride, and other components to produce the modified fuel. In one aspect, the modified fuel can be produced by splash blending the individual components.

The order in which the different components of the modified fuel are added and mixed can vary. In certain aspects, the triglyceride is added to one or more lower alcohols followed by the addition of the base fuel. In one aspect, the process involves (a) admixing ethanol with methanol to produce a first mixture; (b) admixing the triglyceride with the first mixture to produce a second mixture; and (c) admixing the base fuel with the second mixture to produce the modified fuel. In certain aspects, one or more additional components such as a natural oil, a terpene, lubricating oil, or a combination thereof can be admixed with the second mixture prior to step (c).

In one aspect, the process involves (a) admixing ethanol with methanol to produce a first mixture; (b) admixing castor oil with the first mixture to produce a second mixture; and (c) admixing olive oil with the second mixture to produce a third mixture; (d) admixing limonene with the third mixture to produce a fourth mixture; and (e) admixing gasoline with the fourth mixture to produce the modified fuel. In this aspect, it is possible to increase the horsepower of the fuel when limonene is added in this order.

In another aspect, the process includes (a) admixing ethanol with methanol to produce a first mixture; (b) admixing a lubricating oil with the first mixture to produce a second mixture; (c) admixing castor oil with the second mixture to produce a third mixture; (d) admixing olive oil with the third mixture to produce a fourth mixture; (e) admixing limonene with the fourth mixture to produce a fifth mixture; and (f) admixing gasoline with the fifth mixture to produce the modified fuel. Similar to above, it is possible to increase the horsepower of the fuel when limonene is added in this order.

In a further aspect, the process involves (a) admixing ethanol with methanol to produce a first mixture; (b) admixing with the first mixture a composition composed of (i) a triglyceride derived from a fatty acid including at least one hydroxyl group; (ii) a natural oil; and (iii) a terpene, to produce a second mixture, and (c) admixing the base fuel with the second mixture to produce the modified fuel. In another aspect, the process includes (a) admixing ethanol with methanol to produce a first mixture; (b) admixing with the first mixture a composition including (i) castor oil; (ii) olive oil; and (iii) limonene, to produce a second mixture, and (c) admixing gasoline with the second mixture to produce the modified fuel. Further to these aspects, a lubricating oil can be admixed at any step.

In this last aspect, a composition for modifying the properties of a base fuel is composed of (a) a triglyceride derived from a fatty acid having at least one hydroxyl group, (b) a natural oil, and (c) a terpene. In certain aspects, the triglyceride derived from a fatty acid having at least one hydroxyl group, natural oil, and, terpene can be premixed prior to admixing with the lower alcohol and base fuel. In other aspects, the triglyceride derived from a fatty acid having at least one hydroxyl group, natural oil, and, terpene can be part of a kit. In certain aspects, a lubricating oil can be included in the premixed composition or kit.

In one aspect, the process for producing the modified fuel includes admixing (1) a base fuel; (2) a lower alcohol in the amount of greater than 10% by volume of a gallon of modified fuel; and (3) a terpene in the amount of less than 0.1% by weight of the modified fuel, wherein the modified fuel comprises a substantially homogeneous solution.

In one aspect, the process for producing the modified fuel includes admixing (1) a base fuel; (2) methanol in the amount of greater than 10% by volume of a gallon of modified fuel; (3) ethanol in the amount of greater than 5% by volume of a gallon of modified fuel; and (4) a triglyceride derived from a fatty acid comprising at least one hydroxyl group, wherein the modified fuel comprises a substantially homogeneous solution.

The amounts of each component in the premix composition or kit are the same as those discussed above. In one aspect, the premix composition or kit includes (1) castor oil in the amount of 15 mL to 25 mL per gallon of modified fuel; (2) olive oil present in the amount of 0.05 mL to 0.1 mL per gallon of modified fuel; and (3) limonene is present in the amount of 0.01 mL to 0.1 mL per gallon of modified fuel. In another aspect, the triglyceride is castor oil in the amount of less than 0.5% by weight per gallon fuel and the terpene is limonene in the amount of less than 0.1% by weight per gallon of fuel.

The modified fuels described herein possess numerous advantages compared to fuels currently available on the market. For example, the modified fuels can enhance the efficiency of a fuel burning vehicle when introduced into the engine of the vehicle. In one aspect, vehicle efficiency includes increased miles per gallon (MPG), increased horsepower, increased octane, or any combination thereof. In other aspects, the modified fuels can reduce the emissions of a fuel burning vehicle, where the emission includes, but is not limited to, hydrocarbon emissions, carbon monoxide emissions, carbon dioxide emissions, nitrogen oxide emissions, or any combination thereof. In other aspects, when the base fuel is a low octane fuel (e.g., 70 octane), the octane of the base fuel can be raised significantly by the addition of the components described herein (e.g., lower alcohol, triglyceride, etc.). Thus, a base fuel that has an unacceptable octane value can be raised so that the resultant modified fuel can be used in a number of different engines.

It is understood that any given particular aspect of the disclosed compositions and methods can be easily compared to the specific examples and embodiments disclosed herein, including the non-polysaccharide based reagents discussed in the Examples. By performing such a comparison, the relative efficacy of each particular embodiment can be easily determined. Particularly preferred compositions and methods are disclosed in the Examples herein, and it is understood that these compositions and methods, while not necessarily limiting, can be performed with any of the compositions and methods disclosed herein.

EXAMPLES

The following examples are put forth so as to provide those of ordinary skill in the art with a complete disclosure and description of how the compounds, compositions, and methods described and claimed herein are made and evaluated, and are intended to be purely exemplary and are not intended to limit the scope of what the inventors regard as their invention. Efforts have been made to ensure accuracy with respect to numbers (e.g., amounts, temperature, etc.) but some errors and deviations should be accounted for. Unless indicated otherwise, parts are parts by weight, temperature is in $°$ C. or is at ambient temperature, and pressure is at or near atmospheric. There are numerous variations and combinations of reaction conditions, e.g., component concentrations, desired solvents, solvent mixtures, temperatures, pressures and other reaction ranges and conditions that can be used to optimize the product purity and yield obtained from the described process. Only reasonable and routine experimentation will be required to optimize such process conditions.

I. Emissions Testing

ASM2 Testing

With the ASM2 25/25 test (25 miles per hour on flat ground) for normal internal combustion engines for automobiles, the following requirements must be satisfied:
1. the unused hydrocarbons out of the exhaust pipe according to the EPA standards must not exceed 114 ppm (parts per million);
2. the carbon monoxide out of the exhaust pipe must not exceed 0.63 ppm;
3. the nitrous oxide out of the exhaust pipe must not exceed 796 ppm; and
4. the $CO+CO_2$ must exceed a minimum of 6.0 out of the exhaust pipe.

With the ASM2 50/15 test (55 miles per hour up-hill) for normal internal combustion engines for automobiles, the following requirements must be satisfied:
1. unused hydrocarbons out of the exhaust pipe according to EPA standards are not to exceed 117 ppm;

2. the nitrous oxide out of the exhaust pipe must not exceed 879 ppm;
3. the carbon monoxide out of the exhaust pipe must not exceed 0.65 ppm; and
4. the $CO+CO_2$ output must exceed a minimum of 6.0 ppm.

The modified fuel that was used in the following emission tests was composed of 70% by volume 87 octane gasoline, 15% by volume ethanol, 15% by volume ethanol, 12.57 ml of castor oil per gallon of fuel, and 0.5 ounces per gallon of a composition composed of olive oil and limonene.

| 1992 Buick LaSabre | | |
|---|---|---|
| Year: 1992 | Make: Buick | Model: LaSabre |
| Cylinders: 6 | Engine: 3.8 Liters | Trans: Automatic |
| Odometer: 82295 | Body: Sedan | Weight: 3750 lbs. |
| GVWR: N/A | VRT Record 00009957 | Test ID: Free |

| ASM2 EMISSION TEST RESULTS | | | | | | |
|---|---|---|---|---|---|---|
| | 25/25 Test/25 MPH FLAT | | | 50/15 Test/50 MPH UP HILL | | |
| | Reading | Allowed | Results | Reading | Allowed | Results |
| HC ppm | 14 | 114 | pass | 11 | 117 | pass |
| CO % | 0.11 | 0.63 | pass | 0.14 | 0.65 | pass |
| NOx ppm | 0 | 796 | pass | 1 | 879 | pass |
| RPM | 1456 | 2500 max | | 1532 | 2500 max | |
| CO + CO2 | 15.2 | 6.0 min | pass | 15.2 | 6.0 min | pass |

| 2002 Chevy Cavalier 2.2 Liter Engine | | | | | | |
|---|---|---|---|---|---|---|
| | 25/25 Test/25 MPH FLAT | | | 50/15 Test/50 MPH UP HILL | | |
| | Reading | Allowable | Results | Reading | Allowable | Results |
| HC-ppm | 0013 | 114 | pass | 0008 | 117 | pass |
| CO % | 00.00 | 0.63 | pass | 00.00 | 0.65 | pass |
| NOx-ppm | 0010 | 796 | pass | 0015 | 879 | pass |
| RPM | 1866 | 2500 | | 1730 | 2500 | |
| CO + CO2 | 15.05 | 6.0 Min | | 15.4 | 6.0 Min | |

Based on the emissions testing using modified fuels described herein, both vehicles passed the emissions test. Essentially no nitrogen oxide (NOx) was produced in either car. Additionally, high oxygen content was present in the fuel based upon the $CO+CO_2$ values (approximately 15 for each vehicle) versus the minimum requirement of 6.0.

Additional Testing

The exhaust pipe of a 2006 PT Cruiser was permanently extended so that exhaust pipe enters the driver's compartment of the vehicle and emits 100 percent of the engine exhaust back into the driver's compartment. The car was driven on a daily basis with the modified fuel as described above. The vehicle was driven by the co-inventor over 100 miles nonstop without experiencing any discomfort or side-effects.

II. Fuel Mileage

The 1992 Buick LaSabre described above got 23 miles per gallon using 87 octane gasoline. Using the modified fuel used in the emissions test, the same car got 49 miles per gallon with no brown nitrogen oxides observed in the exhaust. Increased gas efficiency was observed in Dodge Caravans, Chevy Trucks, Pontiac Grand Prix's and Ford Mustangs with the modified fuel.

In another test, when performing dynometer tests on a motorcycle or car engine, it was possible to complete more dynometer runs on a fixed amount of modified fuel described herein vs. gasoline. For example, during a dynometer run using a 1397cc motorcycle engine, when 180 mL of gasoline was used only three HP dynometer runs could be performed. Conversely, when 180 mL of modified fuel (60% by volume 89 octane gasoline, 20% by volume ethanol, 20% by volume methanol, and 1 ounce per gallon of a composition composed of olive oil and limonene), five HP dynometer runs were completed. This test indicates a 20% increase in fuel efficiency when using a modified fuel vs. gasoline.

III. Horsepower

Figure 2:
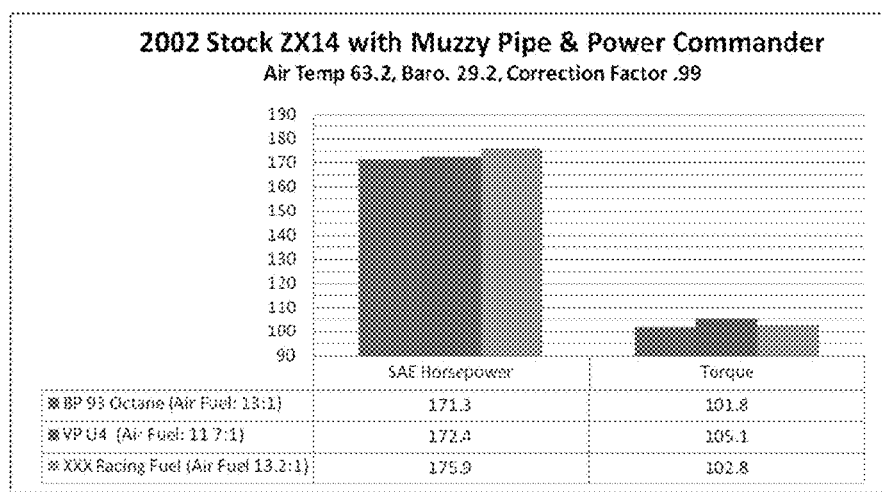
Figure 3:
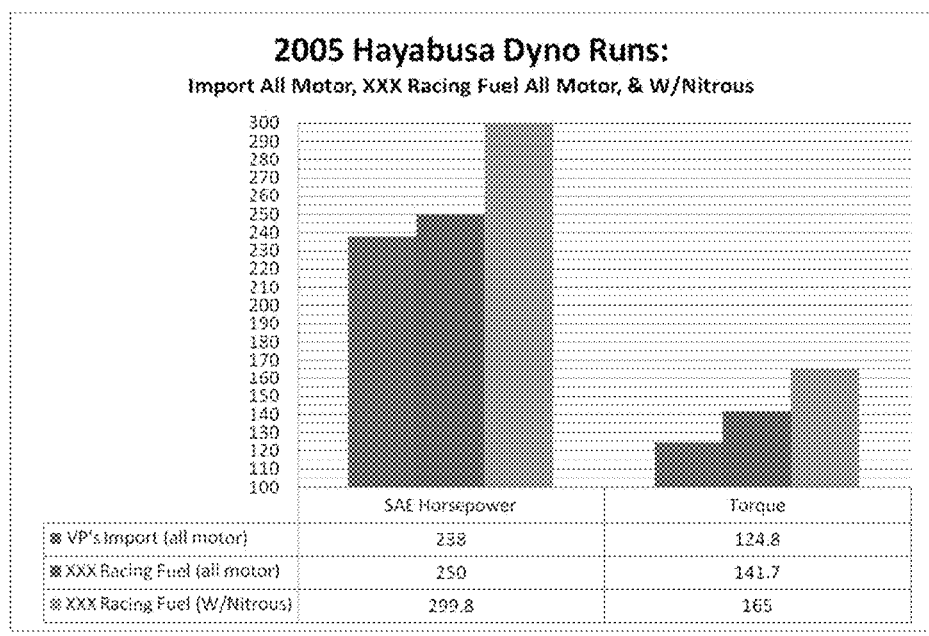

FIGS. 1-3 are graphs comparing the horsepower of the modified fuel in Section II above with other types of commercially-available fuels. Dynometer runs were performed on different motorcycle engines and fuels. Referring to FIG. 1, VP C-16 race fuel, which is a leaded high octane (117) fuel used in turbocharged engines and nitrous applications, has an SAE horsepower 207.1. In the same motorcycle engine, a modified fuel described herein produced an SAE horsepower of 213.7.

In another dynometer run (FIG. 2), the horsepower of BP 93 octane and VP U4 were compared to a modified fuel. Referring to FIG. 2, the modified fuel produced more horsepower (175.9) vs. BP 93 octane (171.3) and VP U4 (172.4). Similar results are shown in FIG. 3. VP Import race fuel, which is a leaded high octane (120+) fuel used in turbocharged engines and nitrous applications had an SAE horsepower of 238 compared to 250 for the modified fuel. When nitrous was added to the modified fuel, the SAE horsepower jumped to 299.8.

In summary, the modified racing fuels described herein provide more horsepower than commercially-available race fuels and reduced emissions. Additionally, the modified fuels are unleaded fuels, which are not the case with current race fuels on the market, which are leaded. Finally, the modified fuels reduce engine wear. For example, after using a modified fuel in a racing application on a Suzuki 1300 Hyabusa over 100 dynamometer runs and over 100 track runs, the engine was completely disassembled with no damage noted.

IV. Certified Test Results

The fuel economy and efficiency of a modified fuel described herein was certified by Roush Emissions Laboratory in Livonia Michigan. The modified fuel (referred to herein in this example as "the XXX Fuel") was composed of the following components: 70 percent base fuel 87 octane, 15 percent methanol, 15 percent ethanol, and 5.5 ml of eco mix (60 vol. % Klotz KL200 lubricating oil, 40 vol % Klotz Benol castor oil, 0.02 mL limonene, 0.02 mL olive oil) per liter of finished fuel.

The baseline fuel used in the experiments was Indolene Clear, which is a 98 octane benchmark laboratory fuel used in the fuel industry to compare and evaluate commercial fuels. The modified fuel was evaluated under city and highway conditions in a GT Mustang (V8 engine, 4.6 L displacement). With respect to city conditions, three different phases were evaluated, which are as follows:

Phase 1: After initial start-up of the engine, the fuel economy and emissions of the Indolene Clear and the XXX Fuel were determined.

Phase 2: After running the engine for 10 minutes, the engine was turned off. The engine was turned back on, and after one minute, the fuel economy and emissions of the Indolene Clear and the XXX Fuel were determined Phase 3: After running the engine for 10 minutes under city conditions, the fuel economy and emissions of the Indolene Clear and the XXX Fuel were determined.

The FTP-75 (Federal Test Procedure) was used to calculate a city average for fuel economy and emissions for Indolene Clear and the XXX Fuel based on the data derived from Phases 1-3 (referred to as "Weighted FTP75" in Tables 1-6). In the case of the highway average, the engine was allowed to run for 15 minutes at 70 mph, at which time the fuel economy and emissions of the Indolene Clear and the XXX Fuel were determined. The results of the tests are shown in Tables 1-6.

Turning to Table 1, the XXX Fuel showed a modest reduction in fuel economy compared to Indolene Clear (17.3% city and 14.6% highway). In comparison, E85, which is composed of 85% ethanol/15% gasoline, there is about a 50% reduction in fuel economy compared to Indolene Clear.

Referring to Tables 2-6, the XXX Fuel out-performed Indolene Clear in every emissions category. The XXX Fuel had a 26.4% (city) and 36.8% (highway) reduction of total hydrocarbon emissions compared to Indolene Clear (Table 2). In the case of carbon monoxide emissions, the XXX Fuel had a 20.2% (city) and 14.3% (highway) reduction compared to Indolene Clear (Table 3). The XXX Fuel had a 2.2% (city) and 4.5% (highway) reduction of carbon dioxide emissions compared to Indolene Clear (Table 4). With respect to NOx emissions, the XXX Fuel had a 45.7% (city) and 39.3% (highway) reduction compared to Indolene Clear (Table 5). Finally, the XXX Fuel had a 56.2% (city) and 48.6% (highway) reduction of non-methane hydrocarbon emissions compared to Indolene Clear (Table 6). In summary, the XXX Fuel burns cleaner and produces less emissions than the benchmark fuel Indolene Clear while having comparable fuel economy.

TABLE 1

Fuel Economy [mpg]

|  | Phase 1 | Phase 2 | Phase 3 | Weighted FTP75 | Highway | Combined FTP + Hwy |
|---|---|---|---|---|---|---|
| Indolene Clear (1) | 16.85 | 15.99 | 19.97 | 17.11 | 30.95 | 21.42 |
| Indolene Clear (2) | 17.20 | 15.86 | 19.03 | 16.91 | 30.64 | 21.18 |
| Indolene Clear (3) | 17.27 | 15.90 | 19.40 | 17.02 | 30.86 | 21.32 |
| Average Baseline | 17.11 | 15.92 | 19.47 | 17.01 | 30.82 | 21.31 |
| Standard Deviation | 0.22 | 0.07 | 0.47 | 0.10 | 0.16 | 0.12 |
| XXX Fuel Test 1 | 14.21 | 13.28 | 16.22 | 14.18 | 26.17 | 17.86 |
| XXX Fuel Test 2 | 14.17 | 13.31 | 16.14 | 14.17 | 26.56 | 17.93 |
| XXX Fuel Test 3 | 13.98 | 13.03 | 15.65 | 13.86 | 26.23 | 17.60 |
| Average XXX | 14.12 | 13.21 | 16.00 | 14.07 | 26.32 | 17.80 |
| Standard Dev | 0.13 | 0.15 | 0.31 | 0.18 | 0.21 | 0.18 |
| Average Difference | −2.98 | −2.71 | −3.46 | −2.94 | −4.49 | −3.51 |
| Average Difference [%] | −17.4% | −17.0% | −17.8% | −17.3% | −14.6% | −16.5% |

TABLE 2

Total Hydrocarbons THC [grams/mi]

|  | Phase 1 | Phase 2 | Phase 3 | Weighted FTP75 | Highway |
|---|---|---|---|---|---|
| Indolene Clear (1) | 0.393 | 0.046 | 0.064 | 0.123 | 0.024 |
| Indolene Clear (2) | 0.211 | 0.027 | 0.047 | 0.071 | 0.019 |
| Indolene Clear (3) | 0.259 | 0.026 | 0.040 | 0.078 | 0.018 |
| Average Baseline | 0.288 | 0.033 | 0.051 | 0.091 | 0.020 |
| Standard Deviation | 0.094 | 0.012 | 0.012 | 0.028 | 0.004 |
| XXX Fuel Test 1 | 0.208 | 0.028 | 0.032 | 0.066 | 0.015 |
| XXX Fuel Test 2 | 0.258 | 0.022 | 0.029 | 0.073 | 0.012 |
| XXX Fuel Test 3 | 0.187 | 0.025 | 0.037 | 0.062 | 0.012 |

TABLE 2-continued

Total Hydrocarbons THC [grams/mi]

|  | Phase 1 | Phase 2 | Phase 3 | Weighted FTP75 | Highway |
|---|---|---|---|---|---|
| Average XXX | 0.217 | 0.025 | 0.032 | 0.067 | 0.013 |
| Standard Dev | 0.036 | 0.003 | 0.004 | 0.005 | 0.001 |
| Average Difference | −0.070 | −0.008 | −0.018 | −0.024 | −0.007 |
| Average Difference [%] | −24.4% | −25.4% | −36.1% | −26.4% | −36.8% |

TABLE 3

Carbon Monoxide CO [grams/mi]

|  | Phase 1 | Phase 2 | Phase 3 | Weighted FTP75 | Highway |
|---|---|---|---|---|---|
| Indolene Clear (1) | 4.048 | 1.528 | 1.475 | 2.035 | 0.631 |
| Indolene Clear (2) | 2.983 | 1.061 | 1.498 | 1.580 | 0.767 |
| Indolene Clear (3) | 3.360 | 1.166 | 0.983 | 1.570 | 0.510 |
| Average Baseline | 3.464 | 1.252 | 1.318 | 1.728 | 0.636 |
| Standard Deviation | 0.540 | 0.245 | 0.291 | 0.266 | 0.129 |
| XXX Fuel Test 1 | 2.807 | 1.013 | 0.642 | 1.282 | 0.561 |
| XXX Fuel Test 2 | 3.106 | 0.981 | 0.762 | 1.360 | 0.537 |
| XXX Fuel Test 3 | 2.956 | 1.190 | 0.962 | 1.493 | 0.538 |
| Average XXX | 2.956 | 1.061 | 0.788 | 1.379 | 0.545 |
| Standard Dev | 0.149 | 0.113 | 0.162 | 0.106 | 0.013 |
| Average Difference | −0.507 | −0.191 | −0.530 | −0.350 | −0.091 |
| Average Difference [%] | −14.7% | −15.2% | −40.2% | −20.2% | −14.3% |

TABLE 4

Carbon Dioxide CO2 [grams/mi]

|  | Phase 1 | Phase 2 | Phase 3 | Weighted FTP75 | Highway |
|---|---|---|---|---|---|
| Indolene Clear (1) | 519.3 | 552.8 | 442.3 | 515.5 | 285.8 |
| Indolene Clear (2) | 511.0 | 558.1 | 464.1 | 522.5 | 288.6 |
| Indolene Clear (3) | 508.3 | 556.8 | 456.1 | 519.1 | 286.9 |
| Average Baseline | 512.9 | 555.9 | 454.1 | 519.0 | 287.1 |
| Standard Deviation | 5.8 | 2.8 | 11.0 | 3.5 | 1.4 |
| XXX Fuel Test 1 | 499.7 | 538.6 | 441.3 | 503.8 | 280.6 |
| XXX Fuel Test 2 | 500.7 | 537.7 | 443.3 | 504.1 | 269.3 |
| XXX Fuel Test 3 | 508.3 | 548.9 | 456.8 | 515.3 | 272.7 |

TABLE 4-continued

Carbon Dioxide CO2 [grams/mi]

|  | Phase 1 | Phase 2 | Phase 3 | Weighted FTP75 | Highway |
|---|---|---|---|---|---|
| Average XXX | 502.9 | 541.7 | 447.1 | 507.7 | 274.2 |
| Standard Dev | 4.7 | 6.2 | 8.4 | 6.5 | 5.8 |
| Average Difference | −10.0 | −14.1 | −7.0 | −11.3 | −12.9 |
| Average Difference [%] | −1.9% | −2.5% | −1.5% | −2.2% | −4.5% |

TABLE 5

Oxides of Nitrogen NOx [grams/mi]

|  | Phase 1 | Phase 2 | Phase 3 | Weighted FTP75 | Highway |
|---|---|---|---|---|---|
| Indolene Clear (1) | 0.0748 | 0.0006 | 0.0073 | 0.0178 | 0.0008 |
| Indolene Clear (2) | 0.0887 | 0.0000 | 0.0110 | 0.0214 | 0.0002 |
| Indolene Clear (3) | 0.0766 | 0.0019 | 0.0066 | 0.0186 | 0.0005 |
| Average Baseline | 0.0800 | 0.0008 | 0.0083 | 0.0193 | 0.0005 |
| Standard Deviation | 0.0075 | 0.0009 | 0.0024 | 0.0019 | 0.0003 |
| XXX Fuel Test 1 | 0.0292 | 0.0000 | 0.0045 | 0.0073 | 0.0000 |
| XXX Fuel Test 2 | 0.0233 | 0.0000 | 0.0106 | 0.0077 | 0.0006 |
| XXX Fuel Test 3 | 0.0668 | 0.0000 | 0.0093 | 0.0164 | 0.0003 |
| Average XXX | 0.0398 | 0.0000 | 0.0081 | 0.0105 | 0.0003 |
| Standard Dev | 0.0236 | 0.0000 | 0.0032 | 0.0051 | 0.0003 |
| Average Difference | −0.0402 | −0.0008 | −0.0002 | −0.0088 | −0.0002 |
| Average Difference [%] | −50.3% | −99.4% | −2.4% | −45.7% | −39.3% |

TABLE 6

Non-Methane Hydrocarbons [grams/mi]

|  | Phase 1 | Phase 2 | Phase 3 | Weighted FTP75 | Highway |
|---|---|---|---|---|---|
| Indolene Clear (1) | 0.3378 | 0.0240 | 0.0383 | 0.0929 | 0.0134 |
| Indolene Clear (2) | 0.1755 | 0.0120 | 0.0258 | 0.0497 | 0.0099 |
| Indolene Clear (3) | 0.2202 | 0.0113 | 0.0203 | 0.0571 | 0.0093 |
| Average Baseline | 0.2445 | 0.0158 | 0.0281 | 0.0665 | 0.0108 |
| Standard Deviation | 0.0838 | 0.0071 | 0.0092 | 0.0231 | 0.0022 |
| XXX Fuel Test 1 | 0.1098 | 0.0038 | 0.0000 | 0.0247 | 0.0067 |
| XXX Fuel Test 2 | 0.1782 | 0.0000 | 0.0000 | 0.0369 | 0.0049 |
| XXX Fuel Test 3 | 0.1216 | 0.0000 | 0.0023 | 0.0258 | 0.0051 |
| Average XXX | 0.1365 | 0.0013 | 0.0008 | 0.0291 | 0.0056 |
| Standard Dev | 0.0366 | 0.0022 | 0.0013 | 0.0067 | 0.0010 |
| Average Difference | −0.1079 | −0.0145 | −0.0274 | −0.0374 | −0.0053 |
| Average Difference [%] | −44.2% | −91.9% | −97.3% | −56.2% | −48.6% |

Throughout this application, various publications are referenced. The disclosures of these publications in their entireties are hereby incorporated by reference into this application in order to more fully describe the compounds, compositions and methods described herein.

Various modifications and variations can be made to the compounds, compositions and methods described herein. Other aspects of the compounds, compositions and methods described herein will be apparent from consideration of the specification and practice of the compounds, compositions and methods disclosed herein. It is intended that the specification and examples be considered as exemplary.

What is claimed:

1. A composition comprising
   (a) castor oil;
   (b) olive oil; and
   (c) a terpene, and
   optionally a lubricating oil, a lower alcohol, or a combination thereof, wherein the composition does not include a base fuel, and wherein the volume ratio of castor oil to olive oil is 3,000:1 to 5:1 and the volume ratio of castor oil to terpene is 3,000:1 to 5:1.

2. The composition of claim 1, wherein composition further comprises a lower alcohol, and the lower alcohol is methanol, ethanol, propanol, butanol, or any combination thereof.

3. The composition of claim 2, wherein the lower alcohol is methanol.

4. The composition of claim 1, wherein the castor oil comprises AA castor oil.

5. The composition of claim 1, wherein the composition comprises a lubricating oil.

6. The composition of claim 1, wherein the terpene comprises an alpha-pinene, a limonene, a menthol, a linalool, a terpinene, a camphene, a careen, or any combination thereof.

7. The composition of claim 1, wherein the terpene is limonene.

8. The composition of claim 1, wherein the terpene is limonene and the composition further comprises a lubricating oil.

9. The composition of claim 1, wherein the terpene is limonene and the composition further comprises a lower alcohol.

10. The composition of claim 1, wherein the terpene is limonene and the composition further comprises a lubricating oil and a lower alcohol.

11. The composition of claim 1, wherein the composition does not include naphtha.

* * * * *